United States Patent Office 2,895,869
Patented July 21, 1959

2,895,869

METHOD FOR CONTROLLING NEMATODES

Henry Bluestone, Cleveland Heights, Ohio, assignor to Diamond Alkali Company, Cleveland, Ohio, a corporation of Delaware No Drawing. Application October 6, 1954
Serial No. 460,755

6 Claims. (Cl. 167—22)

This invention relates to improvements in the control of soil-infesting organisms, and more particularly relates to new and improved toxic substances for the control of nematodes and other parasitical organisms, as well as methods for their use.

The expression "soil-infesting organism," as used in the specification and claims, is intended to include various organisms, such as wire worms, grubs, maggots, and nematodes, or eel worms. Such organisms have been among the most difficult crop pests to control because of their resistance to prior soil fumigants and other treating substances, and because of their ability to survive in the soil for extended periods of time, even in the absence of host plants. Although specific reference is made hereinafter to the control of nematodes, it will be understood, of course, that the present invention contemplates the control of various soil-infesting organisms and parasitical worms and is not limited to the control of nematodes.

Plants attacked by nematodes are damaged primarily due to the feeding of the nematodes on plant tissues. Such attacks may destroy plant cells or simply interfere with their normal function. The most common type of nematode damage is manifested as a destruction of the attacked parts and adjacent tissue, or the growth of galls, root-knobs or other abnormalities. One of the most easily recognized diseases is that of so-called "root-knot" disease. Such root-knots, or galls, contain nematodes, nematode egg masses and/or larvae. Such gall formation in the root system of a plant not only reduces the size and effectiveness of the root system by rotting or otherwise destroying the roots, but also seriously affects other plant tissues, with the result that unless treated, the plant dies. Even in those instances where plants attacked by nematodes are not completely destroyed, the plants generally are weakened, even though there may be no visible injury to any part of the plant above the ground. Although in the past various nematocidal agents have been suggested and used, the problem of nematode soil infestation remains a serious one.

One of the most effective prior methods for destroying such soil-infesting organisms involves the treatment of the soil with steam. In many instances, such a procedure is highly advantageous, because not only are the nematodes and other organisms destroyed, but also the soil is substantially sterilized. However, it will be understood, of course, that such a treatment is highly impracticable in applications other than greenhouse frames or similar relatively small installations.

Another prior control method involves the use of chloropicrin as a soil fumigant. While chloropicrin is an effective nematocide, in many instances it is quite toxic to growing plants and its use requires that certain precautions be observed to avoid plant damage. Moreover, in some cases, difficulties are involved in obtaining an optimum nematocidal effect since some type of liquid seal over the treated soil frequently is necessary to retain the vapors in the soil for a sufficient period of time.

Another substance which has been proposed and used in the control of nematodes is the so-called "DD mixture" (dichloropropane-dichloropropene). While this substance avoids certain of the difficulties encountered in other nematocides, it also has failed to provide a complete solution to the problem of nematode control.

It is therefore a principal object of this invention to provide new and improved toxic substances which are useful in control of nematodes and other soil-infesting organisms.

A further object of the invention is the provision of improved methods for controlling nematodes and other soil-infesting organisms.

A still further object of the invention is to provide novel compositions of matter particularly useful in the control of nematodes and other soil-infestating organisms.

These and other objects and advantages will appear more fully in the following description of the invention.

The present invention contemplates the use, in the control of soil-infesting organisms, of compounds having the following formula:

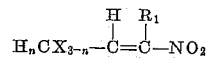

wherein $n$ is a number from 0 to 3, inclusive, X is a halogen, and R is selected from the group consisting of hydrogen, lower alkyl, phenyl, naphthyl, tolyl, xylyl, benzyl and phenethyl radicals.

Typical compounds of the above type are dihalogenated and trihalogenated compounds, which have the following general formulas:

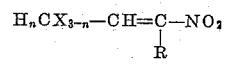

wherein X, and R are as defined before.

Illustrative of specific compounds of the foregoing types are 3,3,3-trichloro-1-nitropropene,
1,1,1-trichloro-3-nitro-2-butene,
1,1,1-trichloro-3-nitro-2-pentene,
3,3-dichloro-1-nitropropene,
3,3-dichloro-1-nitro-1-phenylpropene,
3,3,3-trichloro-1-nitro-1-phenylpropene,
3,3-dichloro-1-nitro-1-phenethylpropene,
3,3,3-trichloro-1-nitro-1-phenethylpropene, and
3,3,3-trichloro-1-benzyl-1-nitropropene.

Compounds of this invention may be employed in a variety of compositions for use in nematocides. The nature of these compositions will depend, to a large degree, upon the particular application contemplated. Hence, they may be utilized in any conventional manner, as in soil application by spraying, drenching, or dusting. In addition, in many instances it is advantageous to introduce composition of the invention directly into the soil by hand or mechanical sub-soil injectors. Generally, superior results are obtained in sub-soil applications when the novel compositions of this invention are introduced into the soil to a depth of 6" or less. The term "soil," as used herein, is intended to include any substance or medium capable of supporting the growth of plants. It is therefore intended to include, in addition to soil, humus, manure, compost, sand, and artificially-created plant growth media, including solutions and/or other hydroponic media.

Compositions of this invention may also be embodied in dusting compounds containing carriers or fillers, such as talc, sand, dry soil, celite, kaolin, fuller's earth, kieselguhr, diatomaceous earth, chalk, gypsum, pyrophyllite, or other inorganic or organic materials, including active ingredients, such as fertilizers, insecticides, fungicides, and/or herbicides. Similarly, if a liquid drench or spray material is desired, a composition of the invention may be formulated as a liquid using as a carrier material various solvents, diluents, extenders, and the like, such as water, aromatic and aliphatic organic liquids, such as acetone, benzene, and/or various alcohols, ethers, ketones, and the like, as well as various petroleum fractions.

Liquid compositions may also contain minor quantities of one or more wetting agents, such as Igepal CO-880 (alkyl phenoxypolyoxyethylene ethanol), Arquad 2-C (quaternary ammonium compound of the formula RR'—N—(CH$_3$)$_2$Cl), Emulphor ON-870 (polyoxyethylated fatty alcohol), Tween 80 (polyoxyethylene sorbitan monooleate), Triton X-155 (alkyl aryl polyether alcohol), Trem 615 (polyhydric alcohol ester), Tween 85 (polyoxyethylene sorbitan trioleate), Nonic 218 (polyethylene glycol tertdodecyl thioether), Santomerse D (decyl benzene sodium sulfonate), Pluronic F-68 (condensate of ethylene oxide with an hydrophobic base formed by condensing propylene oxide with propylene glycol), Antarox A-400 (alkyl phenoxypolyoxyethylene ethanol), Triton X-120 (alkyl aryl polyether alcohol), Nacconol NRSF (alkyl aryl sulfonate), Aresol OS (isopropyl naphthylene sodium sulfonate), Span 40 (sorbitan monopalmitate), Triton B-1956 (modified phthalic glycerol alkyd resin), and Antarox B-290 (polyoxyethylated vegetable oil).

Compounds of the present invention preferably are prepared by reaction of a halogenated aldehyde or ketone and a substituted or unsubstituted nitro compound in a weakly alkaline medium with subsequent dehydration of the halogenated nitroalcohol. For example, 3,3,3-trichloro-1-nitropropene can be prepared by reacting chloral and nitromethane with subsequent dehydration of the 1,1,1-trichloro-3-nitro-2-propanol. Illustrative of suitable dehydrating agents are acetic anhydride and phosphorus pentoxide. While dehydration of a halogenated nitroalcohol at present is a preferred method of preparing compounds embodying the invention, it will be understood, of course, that such compounds may be prepared by other methods.

Nematocidal activity of compositions embodying the invention may be determined in the following manner: one-half gallon glazed crocks having an opening in the bottom are filled with screened, composted soil. This soil is then inoculated with root nematode galls obtained from tomato plants infested with the so-called "Tomato Root Nematode" (*Meloidogyne incognita*). Such galls vary in size from about ⅛" to ¼" in diameter. 5 gms. of tomato roots, cut into pieces about ½" long, are mixed with the thus treated soil in each one-half gallon crock.

The crocks are then watered lightly and allowed to stand over night. Soil additives of this invention, if in liquid form and volatile, are injected in the center of the crock to a depth of about 3" at varying dosages in different tests. If in solid or powder form, the additives are mixed thoroughly with the soil in similar dosages. After the soil is thus treated, the crocks are watered frequently to maintain desired moisture content and are allowed to stand for 10 days, at which time a number of test seeds, e.g., typically squash seeds, are planted in each crock. Two control crocks are similarly prepared. Results are taken in about 20 days after the seeds are planted. The infestation, i.e., the number of galls, is determined either by placing the roots in water in a large Petri dish, or when the roots are heavily infested the degree of infestation is estimated by comparison with the control plants, to which no soil additives have been introduced.

In order that those skilled in the art may more completely understand this invention and the method by which the same may be carried into effect, the following specific examples are offered:

EXAMPLE I

Part A

*Preparation of 1,1,1-trichloro-3-nitro-2-butene.*—Into a 500 ml., 3-neck, round-bottom flask equipped with a thermometer, dropping funnel, and stirrer are introduced 44.5 gms. of 1,1,1-trichloro-3-nitrobutanol-2 and 45 ml. of 95% acetic anhydride and a drop of concentrated sulfuric acid. 20 gms. of sodium acetate is then added and the resultant mixture refluxed for 1 hour. This mixture is cooled, filtered, and the filter cake washed with benzene. The filtrate and wash liquid are combined and distilled, yielding 43.9 gms. of yellow liquid at 54°/0.6 mm.–68°/3 mm. This product is redistilled to yield 13.3 gms. at 54°/0.95 mm.–56°/1.0 mm. The resultant clear, yellow-green liquid, 1,1,1-trichloro-3-nitro-2-butene, has the following analysis:

| Constituent | Percent Calculated | Percent Actual |
|---|---|---|
| C | 23.45 | 23.62 |
| H | 1.95 | 2.04 |
| N | 6.82 | 6.83 |

Part B

To illustrate effectiveness as a soil fumigant and nematocide, the product of Part A is applied to soil around 5 squash seeds (var. Golden Summer Crookneck) in a one-half gallon ceramic crock. Similar tests are conducted using as soil additives a D–D mixture (dichloropropane-dichloropropene mixture), and hexachlorocyclopentadiene as standard materials. At a dosage of 0.5 ml. nematode infestation is effectively controlled using 1,1,1-trichloro-3-nitro-2-butene. The same dosage of the D–D mixture controls the infestation equally well. The hexachlorocyclopentadiene kills all of the squash seed at a dosage of 0.5 ml.

EXAMPLE II

Part A

*Preparation of 3,3,3 - trichloro-1-nitropropene.*—This compound is prepared according to the method described by Brower and Burkett in the Journal of the American Chemical Society, vol. 75, No. 5, at pages 1082 and 1083.

Part B

To illustrate the absence of phytotoxicity, 3,3,3-trichloro-1-nitropropene at 2,000 parts per million is sprayed for 40 seconds at 40 p.s.i. on 25-day old tomato plants (var. Bonny Best) and 25-day old cucumber plants. No plant injury or other phytotoxic effects are observed in either the tomato plants or the cucumber plants.

Part C

To demonstrate its effectiveness as a soil fumigant and nematocide, 3,3,3-trichloro-1-nitropropene is applied to nematode gall-infested soil around 5 squash seeds (var. Golden Summer Crookneck) in a one-half gallon stone crock. Similar tests are conducted using as soil additives a D–D mixture (dichloropropane-dichloropropene mixture) and chloropicrin. The experimental results are indexed comparatively in the following table:

TABLE I

| Soil Additive | Dosage, Ml. | No. Galls on Plants | No. Seeds Emerging | Percent Control |
|---|---|---|---|---|
| 3,3,3-Trichloro-1-Nitropropene | 0.125 | 17 | 5 | 96.5 |
| D–D Mixture | 0.125 | 17 | 3 | 96.5 |
| Chloropicrin | 0.125 | 503 | 5 | 0.0 |
| Untreated | None | 503 | 4 | 0.0 |

Part D

Tests similar to those of Part C are conducted using soil infested with nematodes but no galls. The results, indexed comparatively, are as follows:

TABLE II

| Soil Additive | Dosage, Ml. | No. Galls on Plants | No. Seeds Emerging | Percent Control |
|---|---|---|---|---|
| 3,3,3-Trichloro-1-Nitropropene | 0.125 | 20 | 4 | 94.0 |
| D-D Mixture | 0.125 | 18 | 3 | 93.4 |
| Chloropicrin | 0.125 | 323 | 5 | 0.0 |
| Untreated | None | 323 | 5 | 0.0 |

The experimental results indicated in Parts C and D of Example II clearly indicate the nematocidal effectiveness of a compound of the present invention, both in comparison to an untreated infested soil and in comparison with two widely used soil fumigants.

It is to be understood that although the invention has been described with specific reference to certain embodiments thereof, it is not to be so limited, since changes and alterations therein may be made which are within the full intended scope of the invention as defined by the appended claims.

What is claimed is:

1. The method of controlling nematodes which comprises contacting nematode-infested soil with a nematocidal amount of a composition including as an active toxic ingredient a compound having the formula

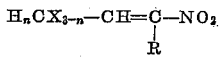

wherein $n$ is a number from 0 to 3, inclusive, X is halogen and R is selected from the group consisting of hydrogen, lower alkyl, phenyl, naphthyl, tolyl, xylyl, benzyl and phenethyl radicals.

2. The method of controling nematodes which comprises contacting nematode-infested soil with a nematocidal amount of a composition including as an active toxic ingredient a compound having the formula $$CCl_3-CH=CH-NO_2$$

3. The method of controlling nematodes which comprises contacting nematode-infested soil with a nematocidal amount of a composition including as an active toxic ingredient a compound having the formula

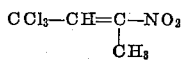

4. The method of controlling nematodes which comprises contacting nematode-infested soil with a nematocidal amount of a composition including as an active toxic ingredient a compound having the formula $$HCCl_2-CH=CH-NO_2$$

5. The method of controlling nematodes which comprises contacting nematode-infested soil with a nematocidal amount of a composition including as an active toxic ingredient a compound having the formula

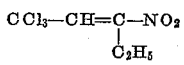

6. The method of controlling nematodes which comprises contacting nematode-infested soil with a nematocidal amount of a composition including as an active toxic ingredient a compound having the formula $$H_2CCl-CH=CH-NO_2$$

References Cited in the file of this patent

UNITED STATES PATENTS

| | | |
|---|---|---|
| 2,335,384 | Bousquet et al. | Nov. 30, 1943 |
| 2,435,204 | Davidson | Feb. 3, 1948 |
| 2,473,341 | Kooijman et al. | June 14, 1949 |
| 2,473,984 | Bickerton | June 21, 1949 |
| 2,502,244 | Carter | Mar. 28, 1950 |
| 2,543,580 | Kay | Feb. 27, 1951 |

OTHER REFERENCES

Frear: "Chem. of the Insecticides, Fungicides and Herbicides," 2nd ed., 1948, D. Van Nostrand, pp. 108–22.

Journal of the American Chemical Society, vol. 75, No. 5, pp. 1082–3 (1953).